(12) United States Patent
Tao et al.

(10) Patent No.: US 10,385,421 B2
(45) Date of Patent: Aug. 20, 2019

(54) RECOVERY OF VALUABLE OR TOXIC METALS FROM SILICON SOLAR CELLS

(71) Applicants: Meng Tao, Fountain Hills, AZ (US); Wen-Hsi Huang, Mesa, AZ (US)

(72) Inventors: Meng Tao, Fountain Hills, AZ (US); Wen-Hsi Huang, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/978,473

(22) Filed: May 14, 2018

(65) Prior Publication Data

US 2018/0291477 A1  Oct. 11, 2018

Related U.S. Application Data

(63) Continuation of application No. PCT/US2016/065608, filed on Dec. 8, 2016.

(60) Provisional application No. 62/265,717, filed on Dec. 10, 2015.

(51) Int. Cl.
| | |
|---|---|
| C22B 7/00 | (2006.01) |
| C01B 33/02 | (2006.01) |
| C01B 33/037 | (2006.01) |
| C22B 3/00 | (2006.01) |
| C22B 15/00 | (2006.01) |
| C22B 25/06 | (2006.01) |

(52) U.S. Cl.
CPC .............. *C22B 7/006* (2013.01); *C01B 33/02* (2013.01); *C01B 33/037* (2013.01); *C22B 11/046* (2013.01); *C22B 13/045* (2013.01); *C22B 15/0063* (2013.01); *C22B 25/06* (2013.01); *Y02P 10/214* (2015.11); *Y02P 10/228* (2015.11); *Y02P 10/234* (2015.11); *Y02P 10/236* (2015.11)

(58) Field of Classification Search
CPC ........................... C22B 11/046; C22B 13/045
See application file for complete search history.

(56) References Cited

U.S. PATENT DOCUMENTS

| | | | |
|---|---|---|---|
| 3,886,055 A | 5/1975 | Baboian et al. | |
| 4,428,917 A | * 1/1984 | Lahoda | ................ C01B 33/039 423/350 |
| 10,072,345 B2 | 9/2018 | Tao | |

(Continued)

FOREIGN PATENT DOCUMENTS

| | | |
|---|---|---|
| CN | 1810394 A | 8/2006 |
| CN | 102343352 A | 2/2012 |

(Continued)

OTHER PUBLICATIONS

Alfonsi, B., "Determination of copper, lead, tin and antimony by controlled-potential electrolysis : Adaptation of the method to the analysis of some alloys", Analytica Chimica Acta, 1958, vol. 19, pp. 569-575 <DOI:10.1016/S0003-2670(00)88221-5>.

(Continued)

*Primary Examiner* — Melissa S Swain
(74) *Attorney, Agent, or Firm* — Snell & Wilmer L.L.P.

(57) ABSTRACT

Exemplary methods provide for recovery of valuable industrial metals in connection with recycling of silicon solar cells and modules. Silicon, copper, silver, and the like may be recovered separately, allowing for cost-effective recycling for silicon solar cells and modules.

6 Claims, 15 Drawing Sheets

(56) References Cited

U.S. PATENT DOCUMENTS

| | | | |
|---|---|---|---|
| 2011/0017020 A1* | 1/2011 | Homma | C22B 3/10 |
| | | | 75/403 |
| 2012/0055547 A1* | 3/2012 | Schultz-Wittmann | |
| | | | H01L 31/02167 |
| | | | 136/256 |
| 2016/0204289 A1 | 7/2016 | Tao et al. | |
| 2017/0133854 A1 | 5/2017 | Tao | |

FOREIGN PATENT DOCUMENTS

| | | | | |
|---|---|---|---|---|
| CN | 103920698 A | | 7/2014 | |
| FR | 2801726 A1 | * | 6/2001 | ........... H01L 31/068 |
| JP | 2011178586 A | * | 9/2011 | |

OTHER PUBLICATIONS

Alfonsi, B., "Determination of copper, lead, tin and antimony by controlled-potential electrolysis : I. General Method of Analysis", Analytica Chimica Acta, 1958, vol. 19, pp. 276-283 <DOI:10.1016/S0003-2670(00)88158-1>.

BINE Informationsdienst, "Recycling Photovoltaic Modules", BINE Informationsdienst Projekt Info, Feb. 2010, 4 pages.

Bohland, J. et al., "Possibility of recycling of silicon PV modules", Conference Record of the 26th IEEE Photovoltaic Specialists Conference (Anaheim, CA, Sep. 29-Oct. 3, 1997), 1997 (Date Added to IEEE Xplore: Aug. 2002), pp. 1173-1175 <DOI:10.1109/PVSC.1997.654298>.

Bruton, T. et al., "Recycling of high value, high energy content components of silicon PV modules", Proceedings of the 12th European Photovoltaic Solar Energy Conference and Exhibition (Amsterdam, The Netherlands, 1994), pp. 459-463.

Dias, P. et al., "Photovoltaic solar panels of crystalline silicon: Characterization and separation", Waste Management and Research, 2016, vol. 34, No. 3, pp. 235-245 <DOI:10.1177/0734242X15622812>.

Dias, P. et al., "Recycling WEEE: Polymer characterization and pyrolysis study for waste of crystalline silicon photovoltaic modules", Waste Management, Feb. 2017, vol. 60, pp. 716-722 <DOI:10.1016/j.wasman.2016.08.036>.

Dilallo, M., "You can't have solar without silver" [online], USA Today, Aug. 2014 [retrieved on May 14, 2019], retrieved from the internet: <URL:https://www.usatoday.com/story/money/markets/2014/08/29/no-silver-no-solar/14756397/>.

Doi, T. et al., "Experimental study on PV module recycling with organic solvent method", Solar Energy Materials and Solar Cells, Mar. 2001, vol. 67, No. 1-4, pp. 397-403 <DOI:10.1016/S0927-0248(00)00308-1>.

European Commission., "Solar Panel Silicon Recovery Methods Tested", Science for Environment Policy, Mar. 2015, No. 407, 1 page.

Fraunhofer Institute for Solar Energy Systems., "Photovoltaics Report", ISE, Nov. 2016.

Frisson, L. et al., "Recent improvements in industrial PV module recycling", 16th European Photovoltaic Solar Energy Conference (Glasgow, UK, May 1-5, 2000), pp. 2160-2163.

Fthenakis, V. et al., "Photovoltaics: Environmental, Health and Safety Issues and Perspectives", Progress in Photovoltaics: Research and Applications, 2000, vol. 8, pp. 27-38.

Fthenakis, V., "End-of-life management and recycling of PV modules", Energy Policy, Nov. 2000, vol. 28, No. 14, pp. 1051-1058 <DOI:10.1016/S0301-4215(00)00091-4>.

Granata, G. et al., "Recycling of photovoltaic panels by physical operations", Solar Energy Materials and Solar Cells, Apr. 2014, vol. 123, pp. 239-248 <DOI:10.1016/j.solmat.2014.01.012>.

Huang, W. et al., "A simple green process to recycle Si from crystalline-Si solar cells", IEEE 42nd Photovoltaic Specialist Conference (New Orleans, LA, Jun. 14-19, 2015), 2015 (Date Added to IEEE Xplore: Dec. 2015), 4 pages <DOI:10.1109/PVSC.2015.7356259>.

Huang, W. et al, "Recovery of valuable and toxic metals from crystalline-Si modules", IEEE 43rd Photovoltaic Specialists Conference (Portland, OR, Jun. 5-10, 2016), 2016 (Date Added to IEEE Xplore: Nov. 2016), pp. 3602-3605 <DOI:10.1109/PVSC.2016.7750344>.

Huang, W. et al, "Strategy and technology to recycle wafer-silicon solar modules", Solar Energy, Mar. 2017, vol. 144, pp. 22-31 <DOI:10.1016/j.solener.2017.01.001>.

International Renewable Energy Agency., "End-of-Life Management: Solar Photovoltaic Panels", 2016.

Jha, M. et al., "Leaching of lead from solder material of waste printed circuit boards (PCBs)", Hydrometallurgy, Jun. 2012, vol. 121-124, pp. 28-34 <DOI:10.1016/j.hydromet.2012.04.010>.

Kang, S. et al, "Experimental investigations for recycling of silicon and glass from waste photovoltaic modules", Renewable Energy, May 2012, vol. 47, pp. 152-159 <DOI:10.1016/j.renene.2012.04.030>.

Kim, Y. et al "Dissolution of ethylene vinyl acetate in crystalline silicon PV modules using ultrasonic irradiation and organic solvent", Solar Energy Materials and Solar Cells, Mar. 2012, vol. 98, pp. 317-322 <DOI:10.1016/j.solmat.2011.11.022>.

Klugmann-Radziemska, E. et al., "Chemical treatment of crystalline silicon solar cells as a method of recovering pure silicon from photovoltaic modules", Renewable Energy, Aug. 2010, vol. 35, No. 8, pp. 1751-1759 <DOI:10.1016/j.renene.2009.11.031>.

Klugmann-Radziemska, E. et al., "Experimental validation of crystalline silicon solar cells recycling by thermal and chemical methods", Solar Energy Materials and Solar Cells, Dec. 2010, vol. 94, No. 12, pp. 2275-2282 <DOI:10.1016/j.solmat.2010.07.025>.

Kowalska, S. et al., "Potential-Controlled Electrolysis as an Effective Method of Selective Silver Electrowinning from Complex Matrix Leaching Solutions of Copper Concentrate", International Journal of Electrochemical Science, 2015 (available online Dec. 2014), vol. 10, pp. 1186-1198.

Mecucci, A. et al, "Leaching and electrochemical recovery of copper, lead and tin from scrap printed circuit boards", Journal of Chemical Technology and Biotechnology, 2002, vol. 77, pp. 449-457 <DOI:10.1002/jctb.575>.

Müeller, A. et al, "Life cycle analysis of solar module recycling process", 20th European Photovoltaic Solar Energy Conference (Barcelona, Spain, Jun. 6-10, 2005), pp. 3211-3213 <DOI:10.1557/PROC-0895-G03-07>.

Mëeller, A. et al., "Recovery of High Value Material of Different Photovoltaic Technologies", 22nd European Photovoltaic Solar Energy Conference (Milan, Italy, Sep. 3-7, 2007), 2007, pp. 2613-2616.

Park, J. et al., "Wet etching processes for recycling crystalline silicon solar cells from end-of-life photovoltaic modules", Royal Society of Chemistry Advances, Aug. 2014, vol. 4, No. 66, pp. 34823-34829 <DOI:10.1039/C4RA03895A>.

Patent Cooperation Treaty, International Searching Authority, International Preliminary Report on Patentability and Written Opinion for PCT/US2016/065608, 9 pages, dated Mar. 13, 2017.

Patent Cooperation Treaty, International Searching Authority, International Search Report for PCT/US2016/065608, 3 pages, dated Mar. 13, 2017.

PV Cycle, "PV Cycle" [online]., PV Cycle, 2013 [retrieved on May 14, 2019 from archive.org, as it appeared on Nov. 5, 2015], retrieved from the internet: <URL:https://web.archive.org/web/20151105193810/http://www.pvcycle.org/homepage/>.

Radziemska, E. et al., "Pure Silicon Recovering from Photovoltaic Modules", Gdansk University of Technology, Dec. 2008, vol. 8, No. 4, pp. 28-34 <DOI:10.2478/v10077-008-0048-8>.

Röver, I. et al., "Process Controlling of the Etching System HF/HNO3/H2O", 20th European Photovoltaic Solar Energy Conference (Barcelona, Spain, Jun. 6-10, 2005), 2005, pp. 899-902.

Sarti, D. et al., "Silicon feedstock for the multi-crystalline photovoltaic industry", Solar Energy Materials and Solar Cells, Apr. 2002, vol. 72, No. 1-4, pp. 27-40 <DOI:10.1016/S0927-0248(01)00147-7>.

Spitzer, M. et al., "Selective electrochemical recovery of gold and silver from cyanide aqueous effluents using titanium and vitreous carbon cathodes", Hydrometallurgy, Oct. 2004, vol. 74, No. 3-4, pp. 233-242 <DOI:10.1016/j.hydromet.2004.05.001>.

(56) References Cited

OTHER PUBLICATIONS

Sun, W. et al., "Electroplated Al as the front electrode in crystalline-Si solar cells", IEEE 42nd Photovoltaic Specialist Conference (New Orleans, LA, Jun. 14-19, 2015), 2015 (Date Added to IEEE Xplore: Dec. 2015), 5 pages <DOI:10.1109/PVSC.2015.7355874>.

Tammaroa, M. et al., "Experimental investigation to evaluate the potential environmental hazards of photovoltaic panels", Journal of Hazardous Materials, Apr. 2016, vol. 306, pp. 395-405 <DOI:10.1016/j.jhazmat.2015.12.018>.

Tao, C. et al., "Natural resource limitations to terawatt-scale solar cells", Solar Energy Materials and Solar Cells, Dec. 2011, vol. 95, No. 12, pp. 3176-3180 <DOI:10.1016/j.solmat.2011.06.013>.

Tao, M., "Manufacturing of Wafer-Si Solar Cells and Modules", in: Tao, M., "Terawatt Solar Photovoltaics" (London, Springer, 2014), pp. 47-60 <DOI:10.1007/978-1-4471-5643-7_4>.

The Silver Institute, "World Silver Survey 2015", Thompson Reuters, May 2015, 104 pages.

U.S. Department of Agriculture, "Supplemental technical report for sodium nitrate (crops)", Supplemental Technical Report, Mar. 2011, 12 pages.

U.S. Geological Survey, "Mineral Commodity Summaries 2015", U.S. Geological Survey (Reston, Virginia), 2015, pp. 146-147 <DOI:10.3133/70140094>.

Van Den Broeck, K. et al., "Sustainable treatment of HF wastewaters from semiconductor industry with a fluidized bed reactor", IEEE Transactions on Semiconductor Manufacturing, Aug. 2003, vol. 16, No. 3, pp. 423-428 <DOI:10.1109/TSM.2003.815624>.

Vanysek, P., "Electrochemical Series", CRC Handbook of Chemistry and Physics, in: Haynes, W. (ed.), "CRC Handbook of Chemistry and Physics" (CRC Press, 2010), pp. 5-82-5-89.

Wambach, K. et al., "A Voluntary Take Back Scheme and Industrial Recycling of Photovoltaic Modules", SolarWorld, 38 pages, retrieved May 14, 2019 from archive.org, as it appeared on Jul. 24, 2015], retrieved from the internet: <URL: https://web.archive.org/web/20150724023026/http://www.bnl.gov/pv/files/PRS_Agenda/3_4_PV-Module-RecyclingWambach.pdf>.

Wambach, K., "Recycling of PV Modules", 2nd World Conference on Photovoltaic Solar Energy Conversion (Vienna, Austria, 1998).

Wang, T. et al., "Recycling of materials from silicon base solar cell module", 38th IEEE Photovoltaic Specialists Conference (Austin, TX, Jun. 3-8, 2012), 2012 (Date Added to IEEE Xplore: Oct. 2012), pp. 2355-2358 <DOI:10.1109/PVSC.2012.6318071>.

Yoo, K. et al., "Recovery of Sn, Ag and Cu from waste Pbfree solder using nitric acid leaching", Materials Transactions, 2012, vol. 53, No. 12, pp. 2175-2180 <DOI:10.2320/matertrans.M2012268>.

Zeng, D. et al., "Pyrolysis of EVA and its application in recycling of photovoltaic modules", Journal of Environmental Sciences (China), 2004, vol. 16, No. 6, pp. 889-893.

\* cited by examiner

US 10,385,421 B2

RECOVERY OF VALUABLE OR TOXIC METALS FROM SILICON SOLAR CELLS

CROSS-REFERENCE TO RELATED APPLICATIONS

This application is a continuation of PCT Application No. PCT/US2016/065608 filed on Dec. 8, 2016 and entitled "RECOVERY OF VALUABLE OR TOXIC METALS FROM SILICON SOLAR CELLS". PCT Application PCT/US2016/065608 claims priority to, and the benefit of, U.S. Provisional Patent Application No. 62/265,717 filed on Dec. 10, 2015 and entitled "RECOVERY OF VALUABLE OR TOXIC METALS FROM SILICON SOLAR CELLS". The contents of each of the foregoing applications are hereby incorporated by reference for all purposes.

TECHNICAL FIELD

The present disclosure relates to silicon solar cells, and in particular to recovery of metals from defective or discarded silicon solar cells.

BACKGROUND

Silicon solar cell manufacturing utilizes various valuable industrial metals, such as copper, silver, and tin. Accordingly, recovery of these metals from discarded or defective silicon solar cells is economically and environmentally desirable.

BRIEF DESCRIPTION OF THE DRAWINGS

With reference to the following description and accompanying drawings.

DETAILED DESCRIPTION

Figure 1A:
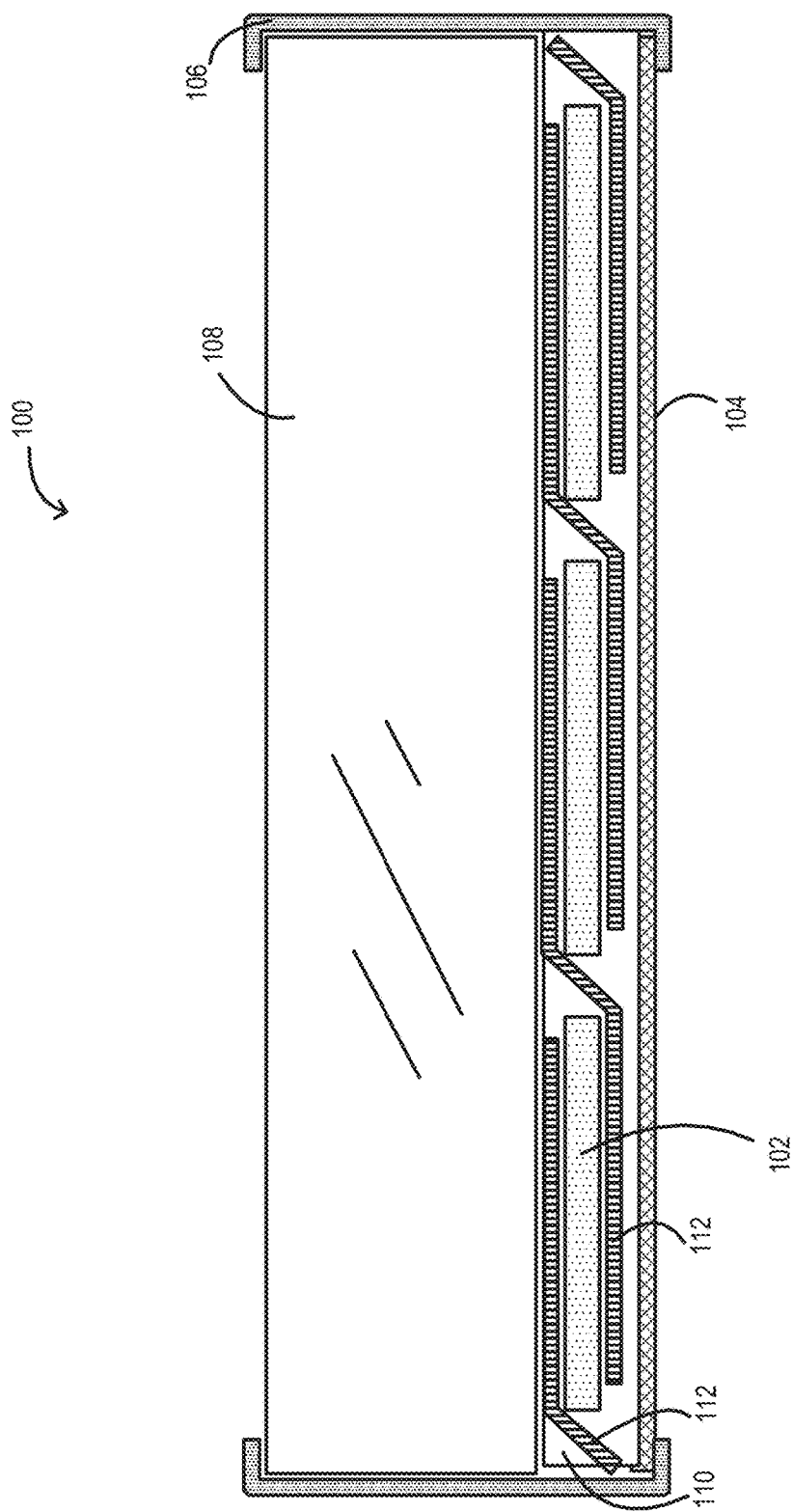
FIG. 1A illustrates a cross sectional view of a silicon solar cell module comprising silicon solar cells from which metals may be recovered in accordance with an exemplary embodiment.

The following description is of various exemplary embodiments only, and is not intended to limit the scope, applicability, or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for materials recycling, mechanical materials separation, magnetic materials separation, electrowinning, electrodeposition, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method for recovery of materials from a silicon solar cell.

Because reclaimed silicon solar cells often have poor efficiency due to damage during separation from the glass, previous recycling methods reclaimed the silicon wafers from the cells. New cells are then fabricated on the reclaimed silicon wafers. However, the silicon cells must be thick enough (over 300 µm) for this approach to be effective. For most common silicon solar cells today, reclaiming silicon wafers requires the removal of the silver and aluminum electrodes, the SiNx anti-reflection layer, the emitter, and the back-surface field of the cells. The back-surface field is typically heavily doped with aluminum and the emitter is typically heavily doped with phosphorus. Thus, these are out of the specifications for solar-grade silicon. Only the base of the cells can be recovered as solar-grade silicon, which is lightly boron doped.

Recently, the thickness of silicon solar cells has been reduced to ~180 µm. The thinness of the silicon wafers prevents silicon cells or silicon wafers to be effectively reclaimed because the cells typically break during separation from the glass. The most recent approach focuses on recovering the solar-grade Si from the cells, which is then used as a feedstock for growth of new silicon ingots. Most of the chemistries developed for wafer reclamation are largely relevant for recovery of solar-grade silicon. However, the recovery of four metals: silver, lead, tin, and copper from silicon solar cells is believed to be first disclosed herein.

There are significant financial incentives to recycle silicon solar modules, as the valuable materials in a typical 60-cell silicon solar module can be valued up to ~$20. A typical 60-cell silicon module contains ~7 g or ~0.23 oz of silver. If 95% of the silver can be recovered, it can be worth approximately $4.50 (at a price of $20/oz of silver). The 60 silicon solar cells contain ~680 g of silicon. If 85% of the silicon can be recovered as solar-grade silicon, it can be worth approximately $10 per module (at a price of $17/kg of solar-grade silicon). Additional values come from the copper ribbons (~$0.16/oz), tin-based solder (~$0.45/oz), aluminum frame, and glass removed from the individual silicon solar cells and modules. As contemplated herein, value-added recycling of silicon modules can be a profitable business without any subsidy, removing a major barrier to the wide practice of silicon solar cell and module recycling.

Additionally, there are significant energy savings by recovering silicon from the modules, as solar-grade silicon is extremely energy intensive due to the ultrahigh purity required. The most energy-intensive step in the production of silicon modules is the Siemens process, which reduces ultrapure $SiHCl_3$ to ultrapure silicon. If the silicon recovered from the modules meets the specifications of solar-grade silicon, it bypasses the Siemens process. Recovered silicon is a new feedstock for the photovoltaic industry and can be fed directly into Czochralski or directional solidification furnaces for growth of new silicon ingots. It is estimated that the energy input is ~400 kWh for a silicon solar module made using fresh silicon, but only ~186 kWh for a silicon solar module made using recycled silicon, i.e. a ~54% energy saving.

During production of silicon solar cells, a significant percentage of the cells produced are not of the required quality. They include broken cells, low-efficiency cells, and other defective cells. These cells total about 5% of all the cells produced. There is currently no established technology to deal with these cells. While low-efficiency cells may sometimes be sold at deep discounts, they typically end up in landfills. Silicon solar cells are also often discarded into landfills when a solar panel fails or is replaced.

Valuable materials are present in these lower quality cells, for example silver, copper, tin, and solar-grade silicon. Each cell contains approximately 11 grams of silicon for a cell sized 156 mm×156 mm×0.2 mm. If 85% of the silicon can be recovered as solar-grade silicon, the resulting approximately 10 grams of solar-grade silicon is worth about 15 cents. Each cell also contains approximately 0.11 grams of silver. At a price of $20/oz for silver, 0.11 g of silver is worth approximately 8 cents. Therefore, the value of these raw materials, when recovered from a silicon solar cell, is approximately 23 cents per cell, which is higher than the cost of recovering the materials via the exemplary approaches disclosed herein. Based on current solar cell manufacturing volumes, recovery of silver and/or silicon from silicon solar cells represents a business opportunity in excess of $100M per year.

Principles of the present disclosure contemplate a process to recover valuable metals and silicon from silicon solar cells. Similarly, principles of the present disclosure contemplate a process to recover solar-grade silicon from silicon solar cells. These processes and other processes may be utilized together to recover these and/or other valuable materials from silicon solar cells.

In various exemplary embodiments, principles of the present disclosure may be utilized to obtain valuable metals from silicon solar cells. With a 90% market share, recycling end-of-life and prematurely-failed silicon solar modules is desirable for a sustainable photovoltaic industry.

In an exemplary embodiment, about 98% of the original silicon solar module by weight can be recovered through the process disclosed above, including substantially all of the front glass, aluminum frame, junction box, about 85% of the silicon, about 95% of the metals (silver, copper, tin, and lead), and part of the polymeric sheets (as a heat source). This is far better than the current 90% recovery available on the market. In addition, use of the exemplary processes disclosed herein provide approximately $20/module in revenue by selling the recovered silicon, silver, copper, tin, glass, and aluminum frame.

Exemplary approaches in accordance with the present disclosure enable green, value-added processes to recycle silicon solar modules. By "green" it is meant that not only the toxic lead is removed from the recycling sludge, but also the chemical wastes from recycling have a minimized environmental impact. By "value-added" it is meant that the valuable silver, tin, and copper in the silicon solar cells may be recovered (for example, by up to about 95%) and the silicon may be recovered (for example, by up to about 85%).

With initial reference to FIG. 1A, a silicon solar module 100 is schematically illustrated. Silicon solar module 100 comprises a plurality of silicon solar cells 102, electronically coupled via interconnects 112. For example, interconnects 112 can comprise copper ribbons soldered to each silicon solar cell 102. In such embodiments, the solder may contain lead and tin. While lead is a toxic metal and is desirably removed from the recycling sludge, tin has a limited reserve of ~4,800,000 tonnes.

In various embodiments, silicon solar module 100 further comprises one or more polymeric layers 110. Polymeric layers 110 can, for example, be affixed to either or both of the top and bottom of silicon solar cells 102 and interconnects 112. In various embodiments, polymeric layers 110 can comprise ethylene vinyl acetate (EVA) on either or both sides of silicon solar cells 102.

Silicon solar module 100 can further comprise a backsheet 104. Backsheet 104 can be affixed to a rear surface of silicon solar cells 102. In various embodiments, backsheet 104 is affixed to one or more polymeric layers 110 positioned on the rear side of silicon solar cells 102. Backsheet 104 can comprise, for example, a polymer such as polyvinyl fluoride (PVF).

In various embodiments, silicon solar cells 102, interconnects 112, backsheet 104, and any other layers of material are laminated to a front glass 108.

Silicon solar module 100 can further comprise a frame 106. In various embodiments, frame 106 comprises an aluminum frame which surrounds the assembly of glass 108 and other components of silicon solar module 100 which are affixed to glass 108 (such as silicon solar cells 102, backsheet 104, and interconnects 112). Frame 106 can, for example, seal the edges of silicon solar module 100.

Figure 1B:
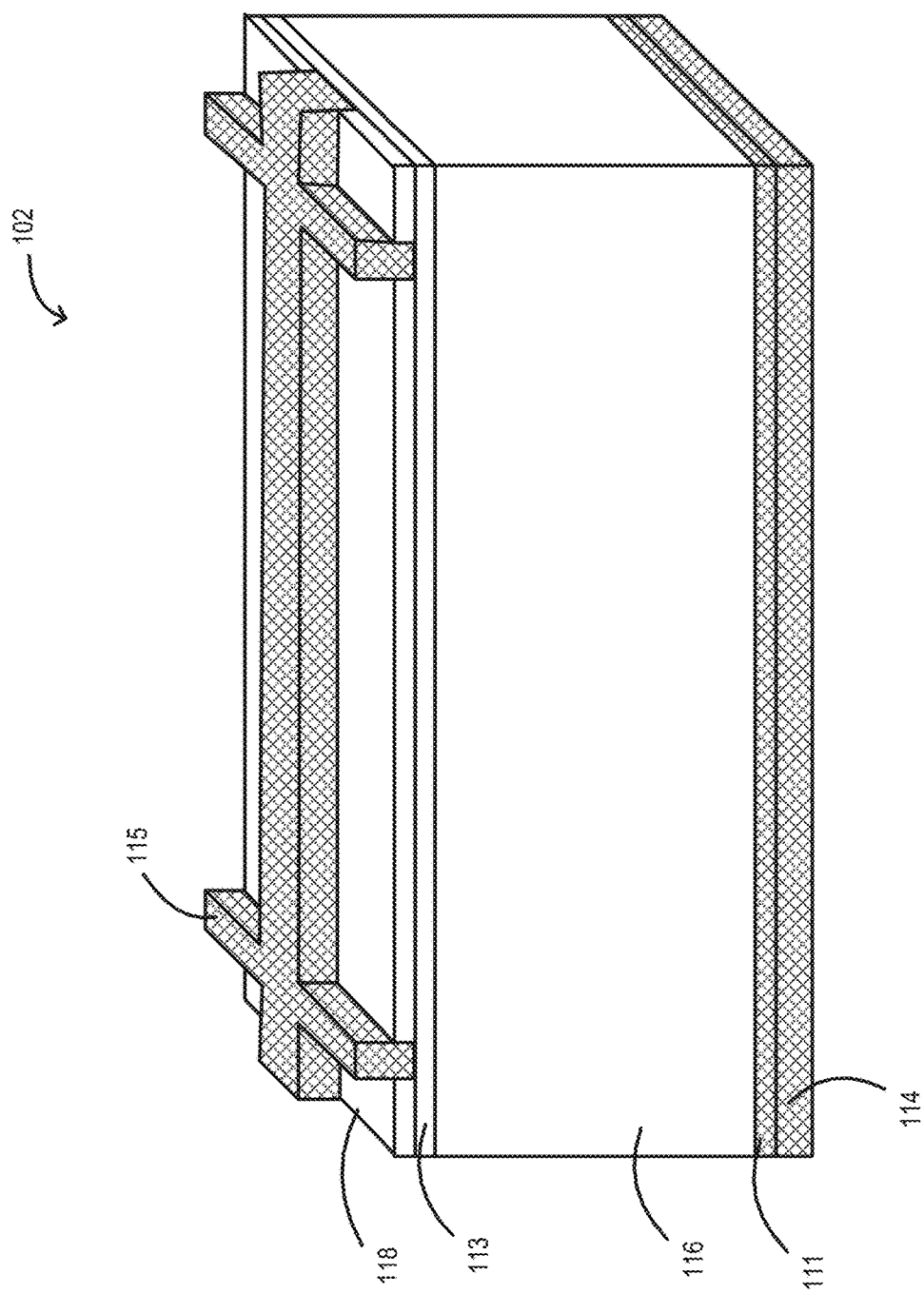
FIG. 1B illustrates a cross sectional perspective view of a silicon solar cell from which valuable metals may be recovered in accordance with an exemplary embodiment.

With initial reference to FIG. 1B, in various embodiments, silicon solar cells 102 comprise a silicon wafer 116 positioned between an emitter 113 and a back-surface field 111. In various embodiments, silicon wafer 116 is a lightly boron-doped layer. Emitter 113 can be, for example, a heavily phosphorus-doped layer positioned on the front of silicon wafer 116. In various embodiments, back-surface field 111 can comprise a heavily aluminum-doped layer.

Silicon solar cells 102 can further comprise a back electrode 114 positioned on the back side of the wafer, e.g., proximate back-surface field 111. Back electrode 114 can, for example, comprise aluminum. In various embodiments, silicon solar cells 102 comprises an anti-reflection layer 118 positioned on the front side of the wafer, e.g., proximate emitter 113. Anti-reflection layer 118 can, for example, comprise a silicon nitride layer. Further, silicon solar cells 102 can comprise a front electrode 115 positioned on the front side of the wafer, e.g., above anti-reflection layer 118. In various embodiments, front electrode 115 comprises silver, and is generally finger-shaped. Compared to other components of silicon solar cells 102, anti-reflection layer 118 and back electrode 114 are of minimal value.

Figure 2A:
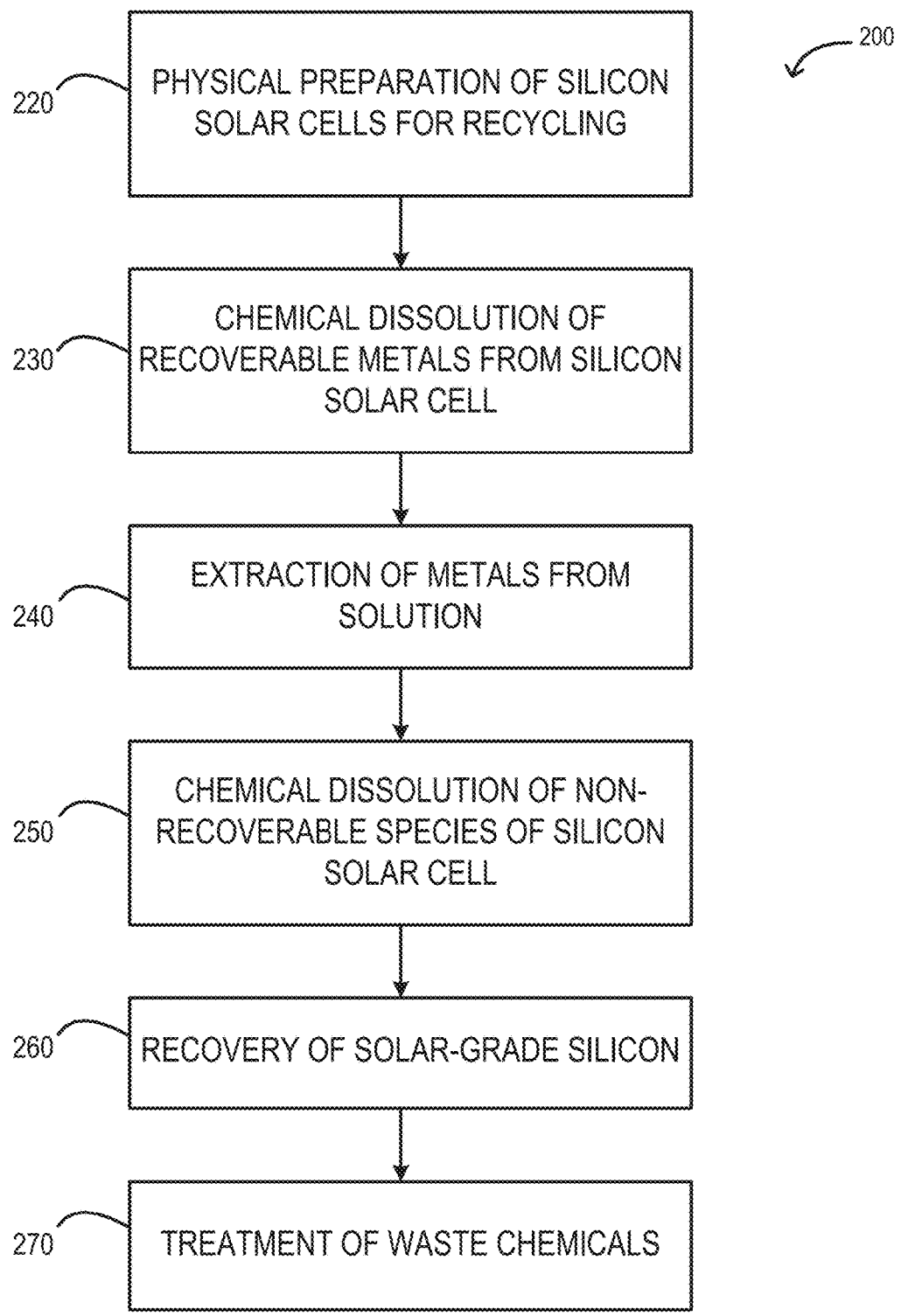
FIG. 2A illustrates a method for recycling valuable metals from silicon solar cell modules in accordance with an exemplary embodiment.

With initial reference to FIG. 2A, a method for recovering valuable metal material from a silicon solar module (such as, for example, silicon solar module 100 comprising a number of silicon solar cells 102 of FIG. 1B) in accordance with an exemplary embodiment is illustrated. In various embodiments, method 200 comprises a physical preparation of silicon solar cells for recycling step 220. For example, step 220 can comprise separation of silicon solar cells from the glass by, for example, removal of components of silicon solar module 100, prior to subjecting the cells to further recycling steps. In various embodiments, step 220 comprises removing one or more frame 106, a junction box, and/or one or more polymeric layers 110.

For example, an aluminum frame 106 and a junction box of solar cell module 100 can be mechanically removed prior to recycling of cells 102. After physical removal of various components (i.e., frame 106, and/or a junction box), silicon solar module 100 can, for example, be subjected to a thermal process (for example, in a furnace) to vaporize polymeric layers 110 and backsheet 104. While the polymer layers 110 and backsheet 104 are burned into $CO_2$, they can serve as a heat source for the thermal process. The thermal process separates silicon solar cells 102 from glass 108, and the glass 108 can be then recycled.

After silicon solar module 100 is subjected to the thermal process, silicon solar module 100 comprises a string of interconnected silicon solar cells 102, intact or broken. Previously, the focus of recycling of silicon solar cells was on recovering the cells intact and then reusing the reclaimed cells in new modules. This approach worked for two reasons: silicon solar cells typically have a longer working lifespan than the modules; and the silicon solar cells produced before at this time were thicker (over 300 μm) than those produced today. The thicker silicon solar cells ensured that during separation from the glass, most cells remained unbroken.

In various embodiments, method 200 can further comprise a chemical dissolution of recoverable metal species from a silicon solar cell (e.g., silicon solar cells 102 of silicon solar module 100) step 230. In various embodiments, step 230 comprises immersing the silicon solar cell into one or more dissolving agents selected to dissolve specific metal species from the cell. The dissolution of these metals into a solution forms a metal-bearing solution from which the metals can be extracted.

Figure 3A:
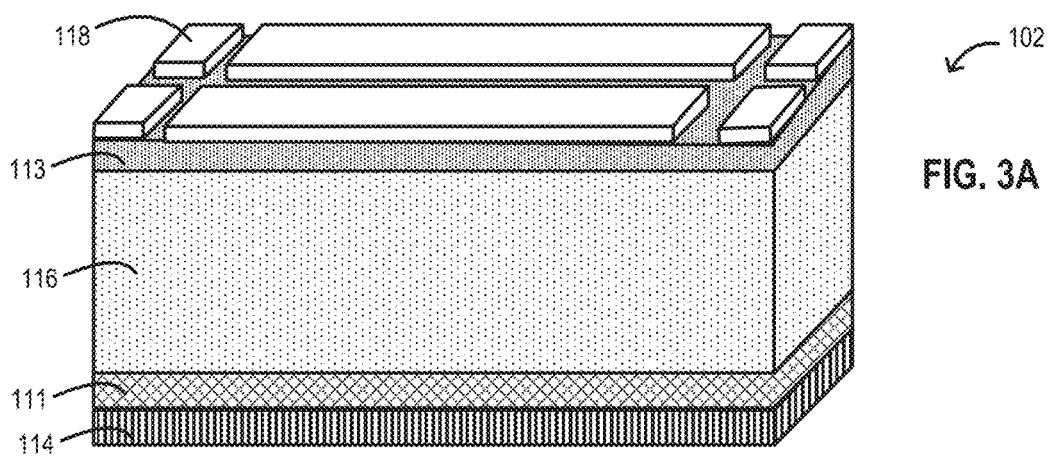
FIGS. 3A-C illustrate components of a typical silicon solar cell during a recovery process in accordance with an exemplary embodiment.

For example, silicon solar cells 102 can be first immersed in an aqueous solution of nitric acid (HNO3). With an appropriate concentration, temperature, and time, one or more metal species contained within the silicon solar cell, such as, for example, silver, dissolves in the nitric acid solution. After the metal species are substantially and/or completely dissolved, the partially dissolved silicon solar cell is removed from the solution. With initial reference to FIG. 3A, silicon solar cell 102 after immersion in nitric acid for a sufficient time is illustrated. In various embodiments, immersion in nitric acid for a sufficient time dissolves substantially all of silver, lead, tin, and copper present in and on silicon solar cells 102.

Step 230 can comprise a selective, self-limited chemistry that simplifies process control by, for example, preventing over-etching or over-dissolution of specific metal species. For example, HNO3 removes the silver electrode and copper interconnects (without removing any silicon or silicon nitrides). As will be described in further detail, other chemical solutions can be used to remove other components of silicon solar cells 102.

In various embodiments, method 200 further comprises an extraction of metals from solution step 240. Step 240 can comprise, for example, extraction of one or more of the metal species dissolved from the silicon solar cell in step 230. Such metals include, for example, silver, copper, lead, and/or tin.

Figure 2B:
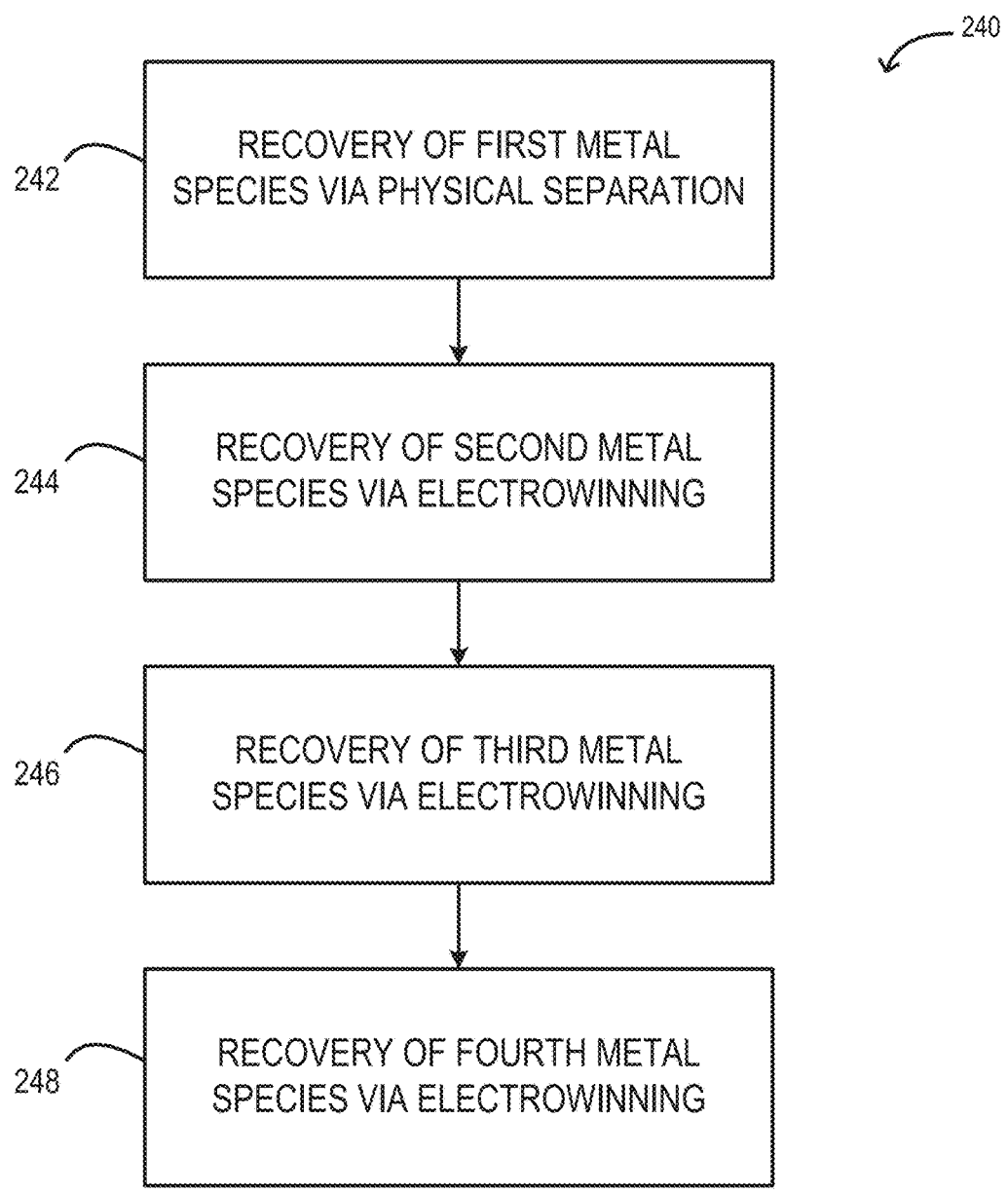
FIG. 2B illustrates an embodiment of a step of method 200 of FIG. 2A.

Step 240 can comprise, for example, the extraction of multiple metal species from solution. With initial reference to FIG. 2B, in various embodiments, step 240 can comprise recovery of a first metal species via physical separation step 242, recovery of a second metal species via electrowinning step 244, recovery of a third metal species via electrowinning step 246, and recovery of a fourth metal species via electrowinning step 248.

Figure 6:
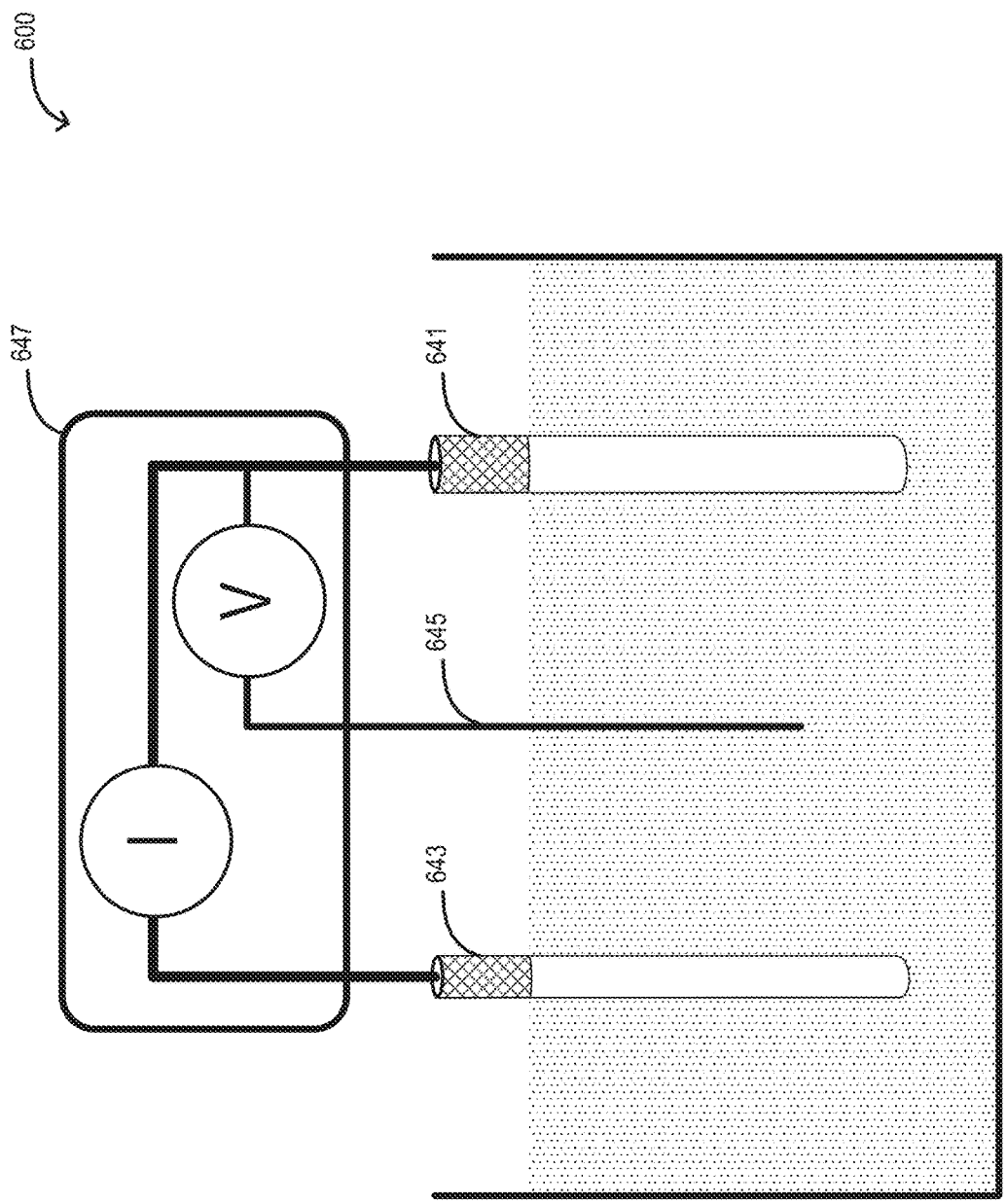
FIG. 6 illustrates an electrolytic setup for metal recovery in accordance with an exemplary embodiment.

For example, step 240 can comprise subjecting the solution formed in step 240 to a sequential electrowinning process. In such embodiments, steps 244, 246, and 246 are performed sequentially. With initial reference to FIG. 6, in various exemplary embodiments, step 240 comprises utilizing a three-electrode cell 600 for the sequential electrowinning of the solution formed in step 230. Three-electrode cell 600 can comprise a first working electrode 641a, a counter electrode 643, and a reference electrode 645. Reference electrode 645 and counter electrode 643 can comprise, for example, inert materials such as glassy carbon. First working electrode 641a can comprise, for example, a silver or copper material. The choice of material for first working electrode 641a can depend on the metal species being recovered. The voltage applied to working electrode 641a with respect to reference electrode 645 can, for example, be controlled by a potentiostat 647. Voltage applied to three-electrode cell 600 through the electrodes causes selected metal ions to deposit on working electrode 641.

Table 1 below illustrates standard reduction potentials vs. standard hydrogen electrode (SHE) for redox pairs of the metal species involved in silicon solar cell recycling. The different reduction potentials for different metals allow them to be extracted from the solution one by one, i.e. "sequential" electrowinning.

TABLE 1

| Redox Pair | Reduction Reaction | Standard Reduction Potential |
|---|---|---|
| $Ag^+/Ag$ | $Ag^+ + e^- = Ag$ | 0.7996 V vs SHE |
| $Cu^{2+}/Cu$ | $Cu^{2+} + 2e^- = Cu$ | 0.3419 V vs SHE |
| $Pb^{2+}/Pb$ | $Pb^{2+} + 2e^- = Pb$ | −0.1262 V vs SHE |

In various embodiments, step 230 dissolves silver, lead, and copper from whole and fragmented silicon solar cells 102 in the HNO3 solution. Tin present in silicon solar cells 102 precipitates in the HNO3 solution as solid $SnO_2$. Step 240 can comprise separating tin from the solution by sedimentation (step 242), followed by subjecting the HNO3 solution to sequential electrolysis to recover silver, copper, and lead (steps 244-248). In an exemplary embodiment, the order in which the metals are recovered from the HNO3 solution via sequential electrowinning is: silver (step 244), copper (step 246), and lead (step 248).

If the actual reduction potentials for the metals match their standard reduction potentials in Table 1, sequential electrowinning is achieved by the following procedure. First, a silver first working electrode 641a is inserted into the HNO3 solution. A voltage between 0.3419 V and 0.7996 V vs SHE is applied to silver first working electrode 641, resulting in silver deposition on the electrode. After the silver present in the solution is sufficiently removed, a second working electrode 641b comprising copper replaces first working electrode 641a. Copper is then deposited on second working electrode 641b by applying a voltage between −0.1262 V and 0.3419 V vs SHE on the electrode. After the copper present in the solution is sufficiently removed, a third working electrode 641c comprising copper replaces second working electrode 641b. Lead is recovered from the solution by applying a more negative voltage than −0.1262 V vs SHE to third working electrode 641c.

In practice, the actual reduction potential for a metal depends on its concentration, temperature, as well as kinetic factors. The actual reduction potentials for the four metals may be determined by cyclic voltammetry, and the measured reduction potentials will then determine the voltages to be applied to the first, second, and third working electrodes 641a-641c for recovery of the metals.

Experimental Example

To measure the metal recovery rate in a sequential electrowinning process, a simulated leaching solution was utilized for the experiment. Metal contents in typical silicon solar modules are listed in Table 2 below. For experimental purposes, a tin content equal to the content of lead was assumed. Aluminum does not dissolve in HNO3 and its reduction potential is too negative to allow recovery by electrowinning from an aqueous solution. As a result, aluminum is not included in this experiment. 0.0431 g of silver, 0.72 g of tin, 0.72 g of lead, and 4.31 g of copper pellets were added to a 100-ml beaker containing an aqueous solution of 11.4% HNO3. The pH of the solution was between 0 and 1. If the pH were less than 0, silver would not deposit on a titanium working electrode during electrowinning. The beaker was heated on a hotplate to 60° C. After the metal pellets were completely dissolved, the solution was cooled down to 25° C.

TABLE 2

| Metal in wafer-Si module | Content (weight %) |
| --- | --- |
| Al | 10% |
| Si | ~3% |
| Pb | <0.1% |
| Cu | 0.6% |
| Ag | <0.006% |

The leaching solution was subjected to sequential electrowinning to recover the remaining metals, silver, copper, and lead. A platinum foil and a titanium foil were used as the counter electrode and working electrode, respectively, since they are stable in concentrated HNO3. An Ag/AgCl electrode was used as the reference electrode. A Gamry Reference 3000 potentiostat was used to conduct the electrowinning. Voltammetry was performed on the leaching solution to measure the reduction potential for each of the three remaining metals, silver, lead, and copper. The scan rate was 10 mV/s. A progressively more negative voltage was then applied to the titanium working electrode to recover the metals one at a time. Each voltage was applied for 7,000 seconds. The deposit on the working electrode for each voltage was characterized by energy-dispersive x-ray spectroscopy (EDX). For maximum recovery rates, the time for silver recovery was increased to 20,000 seconds, and the time for copper recovery was increased to 24 hrs. The solution was stirred to speed up the diffusion of Ag+ and Cu2+ ions.

Figure 7A:
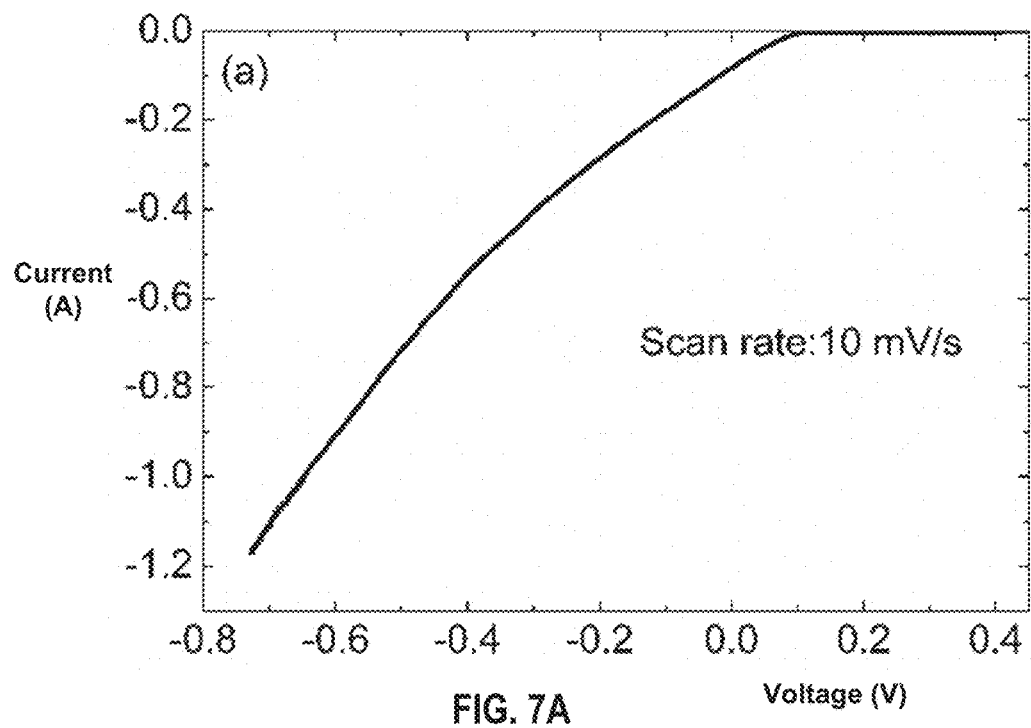
FIG. 7A illustrates a voltammetry of an experimental leaching solution in accordance with an exemplary embodiment.
Figure 7B:
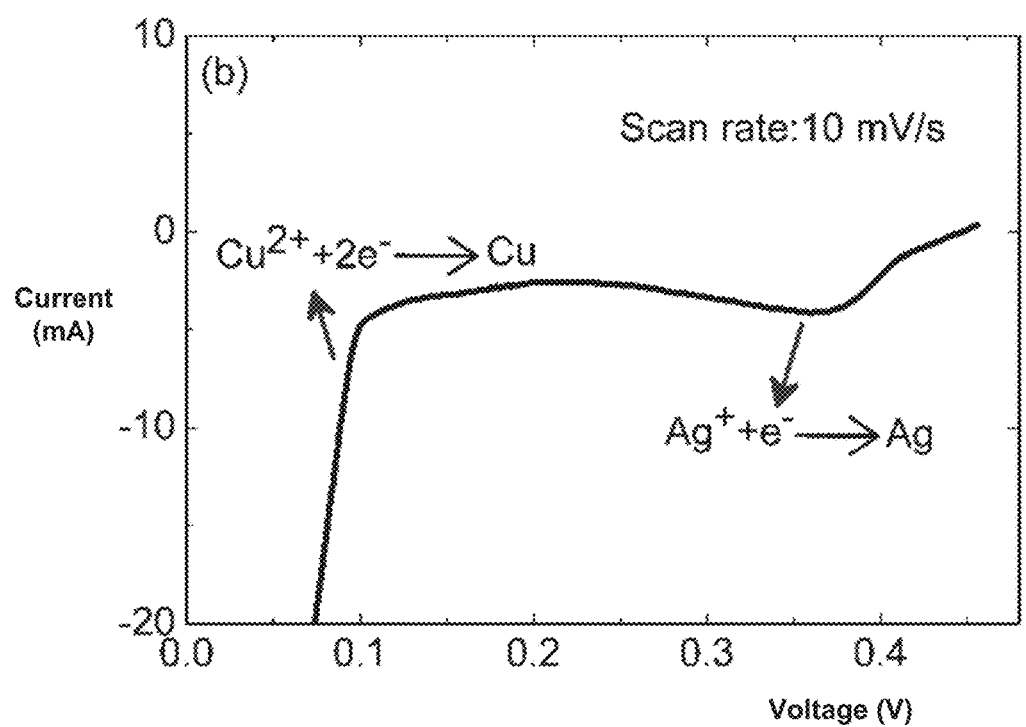
FIG. 7B illustrates an enlarged section of the voltammetry of the experimental leaching solution illustrated in FIG. 7A.

FIG. 7A illustrates the voltammetry of the leaching solution. There was a large cathodic current at ~0.1 V vs. the Ag/AgCl reference electrode, indicating that a metal species was reduced. FIG. 7B illustrates an enlarged portion of the voltammetry of FIG. 7A, between 0.45 V and 0 V, demonstrating two reduction reactions. The first reduction reaction began at ~0.43 V and reached a peak at ~0.35 V. The second reduction reaction occurred at ~0.1 V. Since silver is the noblest metal and copper is the second noblest in the solution, the first and second reduction reactions are attributed to silver reduction and copper reduction, respectively. The window to separate silver from copper is between 0.43 V and 0.25 V from FIG. 7B.

Figure 8:
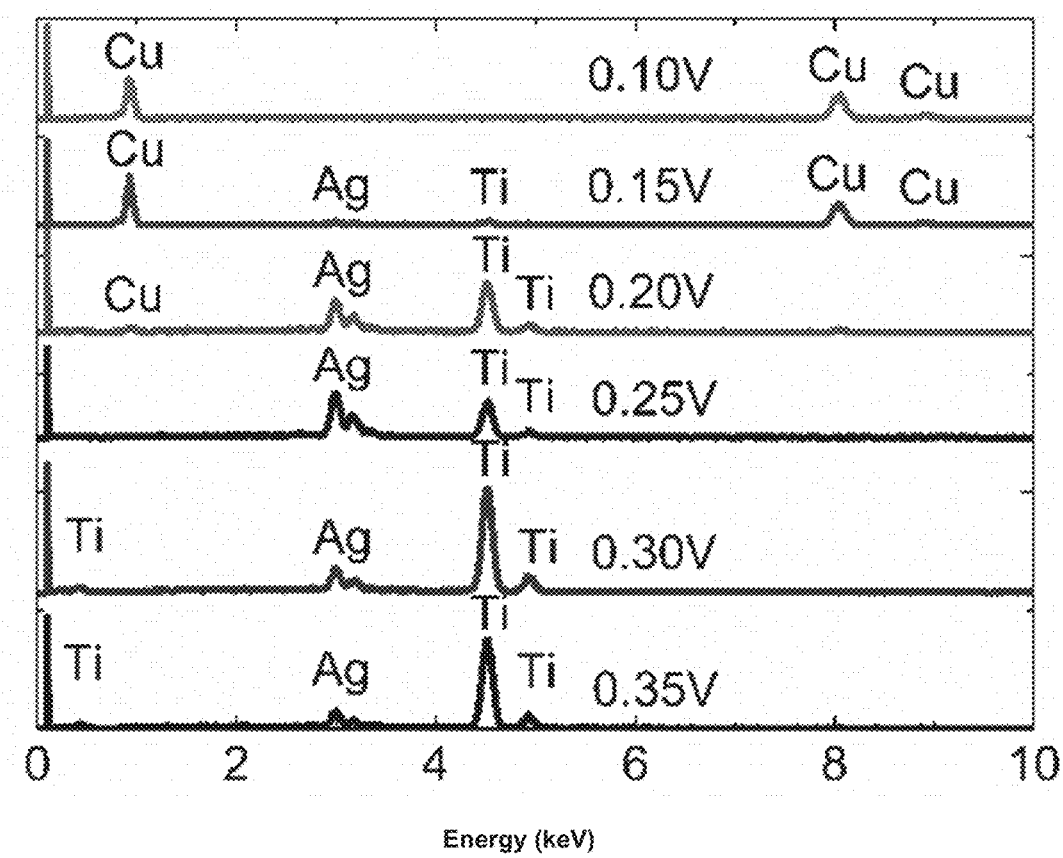
FIG. 8 illustrates an EDX spectra of metal deposits on a working electrode under different voltages in accordance with exemplary embodiments.

FIG. 8 shows EDX analysis of the deposits under different voltages on the titanium working electrode. Titanium peaks occurred because of the titanium electrode. Between 0.35 V and 0.25 V, the deposits contained only silver. However, when the voltage was less than 0.2 V, copper began to appear up in the EDX spectra. As a result, the window to recover 99% pure silver was between 0.45 V and 0.25 V vs. Ag/AgCl because the detection limit of EDX is typically below 1%. The concentration of silver in the solution decreased with time. The Nernst equation states that, when the concentration decreases, the reduction potential becomes more negative. Although the minimum voltage before Cu2+ reduction is 0.25 V, 0.3 V vs. Ag/AgCl is chosen for silver recovery.

Figure 9:
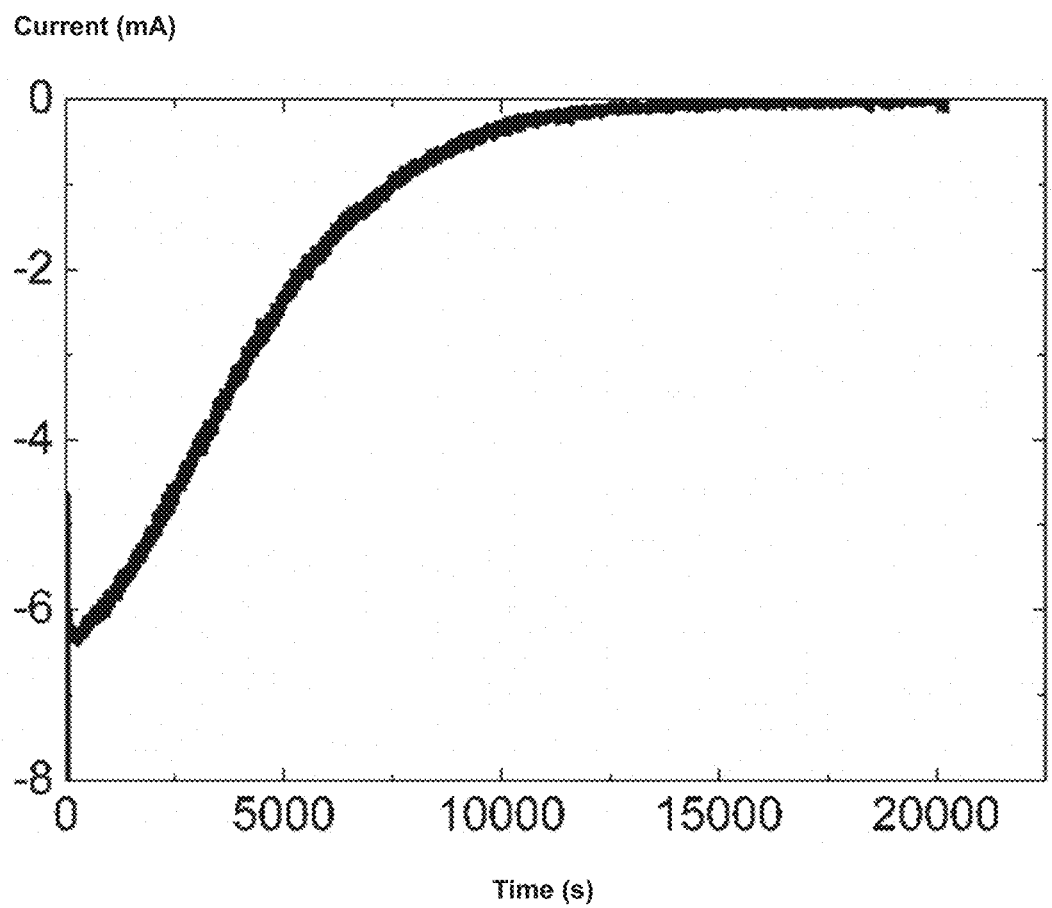
FIG. 9 illustrates a current-time plot for silver recovery on a working electrode in accordance with an exemplary embodiment.
Figure 10:
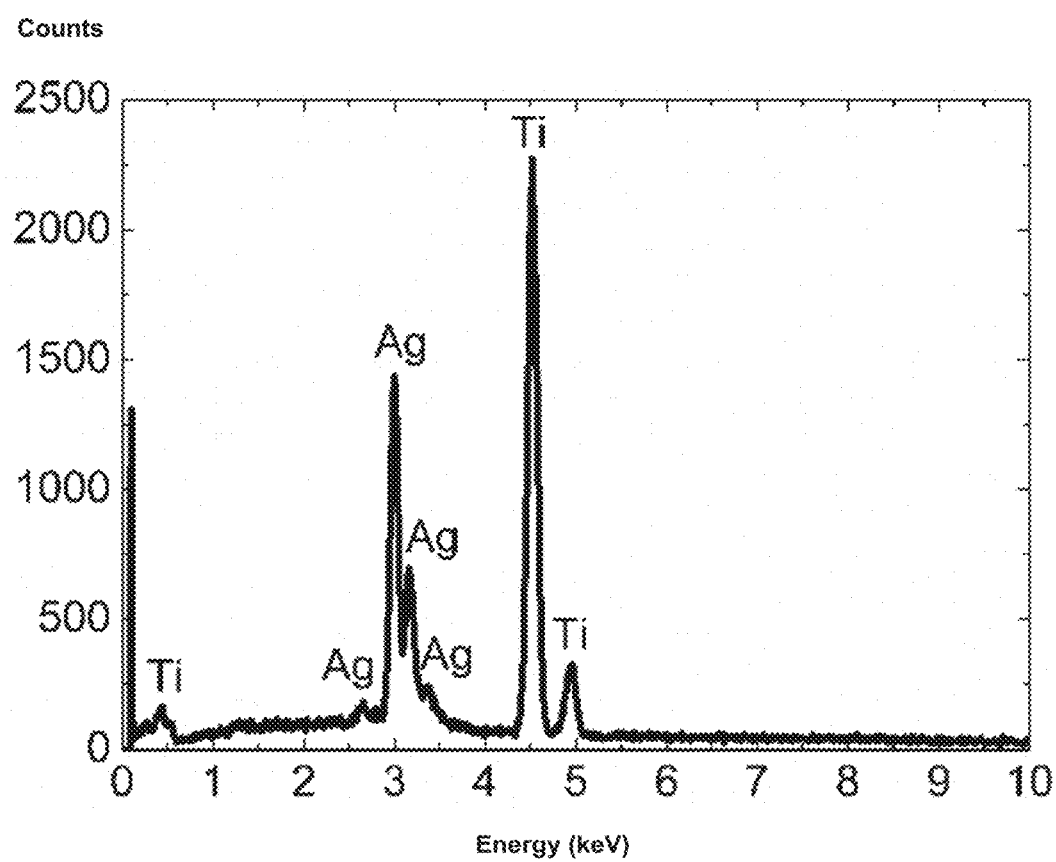
FIG. 10 illustrates an EDX spectra of metal deposits on a working electrode in accordance with an exemplary embodiment.

FIG. 9 illustrates the current vs. time plot for silver recovery with the voltage on the titanium working electrode at 0.3 V vs. Ag/AgCl. The total electrowinning time was 20,000 seconds. The reduction current decreased with time as the concentration of Ag+ decreased over time. It does not reach zero, suggesting a kinetic limit to silver recovery. FIG. 10 illustrates the EDX analysis of the deposit at 0.3 V vs. Ag/AgCl for 20,000 seconds. It demonstrates only silver peaks from the recovered silver and titanium peaks from the titanium electrode. The purity of the recovered silver was at least 99%. The recovery rate of silver in this experiment was 74%. This was obtained by measuring the weight gain of the titanium working electrode and comparing it with the amount of silver in the solution. By minimizing kinetic factors, the recovery rate of silver can be significantly improved. The current efficiency for silver recovery was 99.7%.

Figure 11:
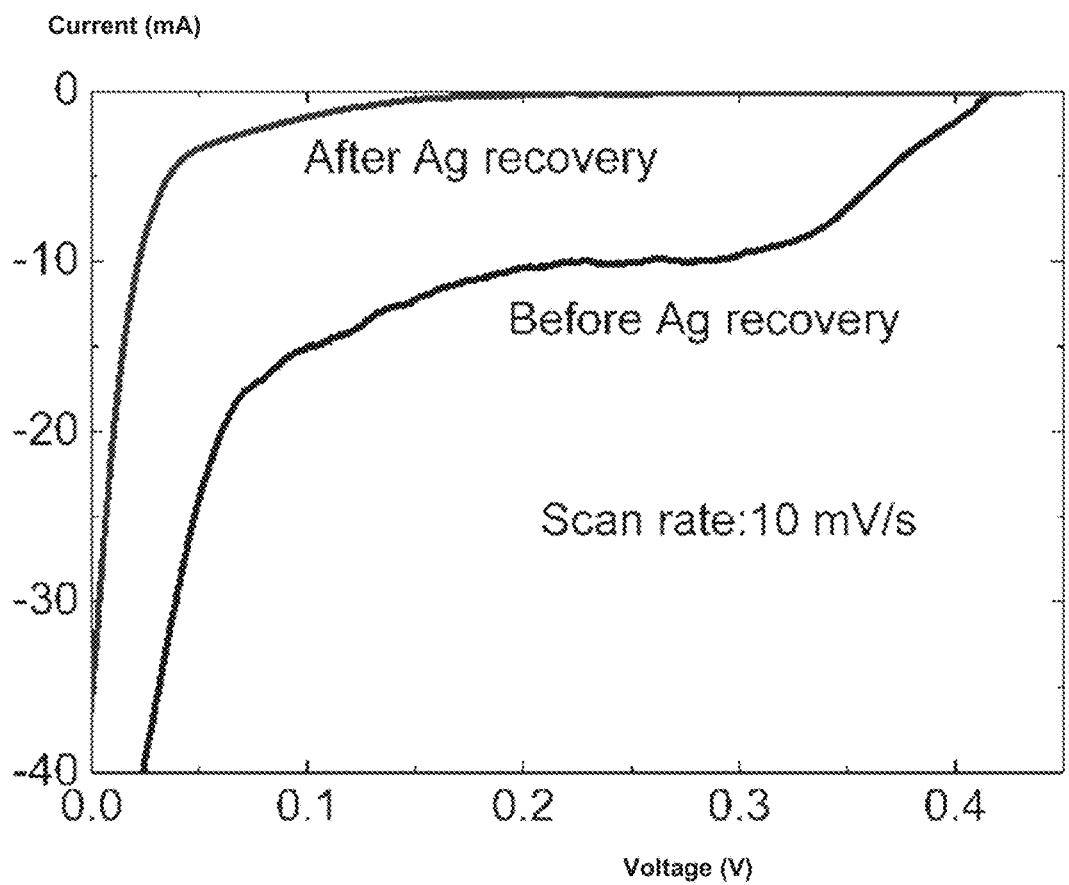
FIG. 11 illustrates a comparison of a voltammetry of a leaching solution before and after recovery of silver from the solution in accordance with an exemplary embodiment.

FIG. 11 illustrates a comparison of the voltammetry of the leaching solution before and after silver recovery. After silver recovery, the Ag+ reduction reaction at ~0.35 V disappeared and only the reduction reaction of Cu2+ was still present. This further supports that only silver was removed from the solution during silver recovery.

Figure 12:
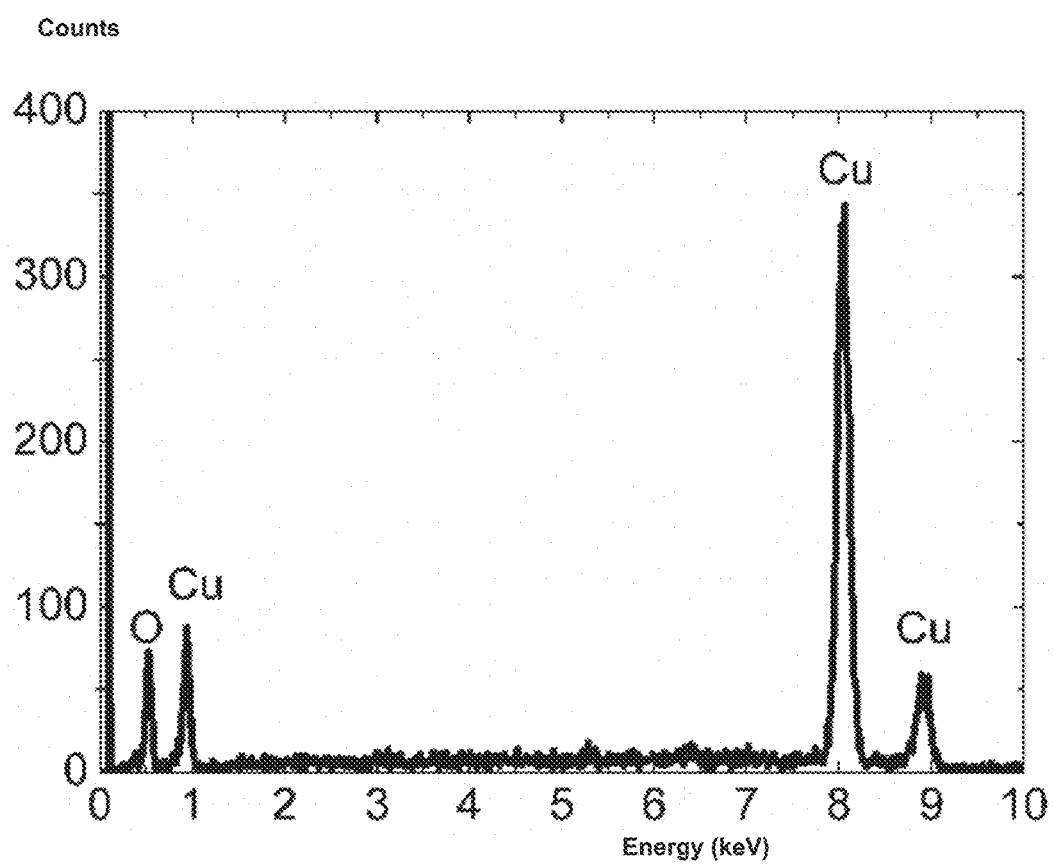
FIG. 12 illustrates an EDX spectra of metal deposits on a working electrode in accordance with an exemplary embodiment.

Copper recovery was performed after silver recovery. −0.3 V vs. Ag/AgCl was applied to the titanium electrode. The reduction reaction of Pb2+ was shadowed by the reduction reaction of Cu2+ in FIGS. 7A, 7B, and 11. FIG. 12 illustrates an EDX analysis of the deposit on the titanium electrode at −0.3 V for 24 hrs. There were copper peaks present, but there was no lead peak in the EDX, indicating that copper with 99% purity was recovered from the Pb2+- containing solution. The titanium peaks were not present, as the copper deposit was sufficiently thick to prevent their appearance. The oxygen peak was due to oxidation of copper on the titanium working electrode. The recovery rate of Cu was 83%.

Figure 13:
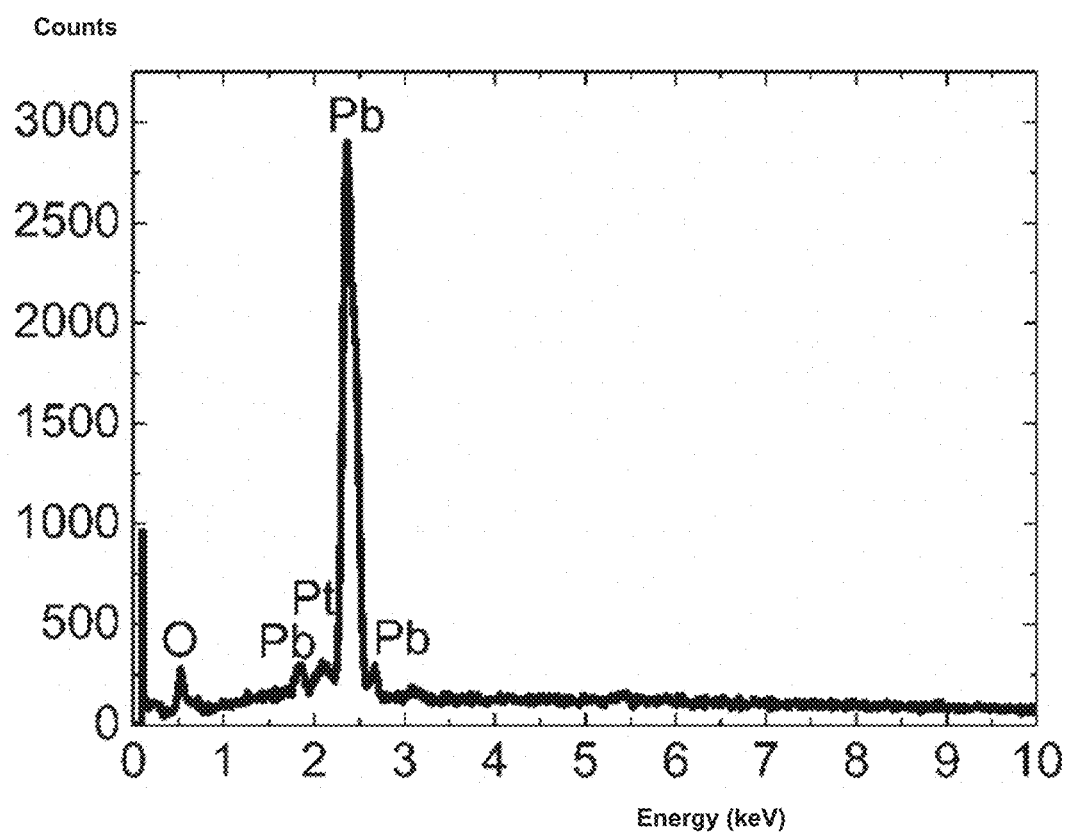
FIG. 13 illustrates an EDX spectra of metal deposits on a counter electrode in accordance with an exemplary embodiment.

It was determined that Pb2+ ions deposited on the platinum counter electrode as PbO2 during copper recovery. FIG. 13 illustrates an EDX analysis of the platinum electrode after copper recovery. Lead peaks were present, indicating that when copper was recovered on the titanium working electrode, lead was also recovered on the platinum counter electrode. The oxygen peak was small, possibly due to the nonstoichiometric PbOx (x<2) on the platinum counter electrode. The solution after the recovery of copper for a period of 48 hrs was investigated by inductively coupled plasma optical emission spectroscopy (ICP-OES). The results are listed in Table 3. Silver and copper were largely removed from the solution. The tin concentration was high because the filtration of SnO2 was done only with a simple filter paper. With the lead concentration at 92 ppm and the volume of the solution at 60 ml, the amount of lead in the solution was ~5.5 mg. This was only 0.76% of the lead in the starting solution, i.e. over 99% of the Pb2+ ions are removed from the solution during copper recovery and the solution is almost free of toxic lead.

TABLE 3

| Metal | Content (ppm) |
|---|---|
| Ag | 0.034 |
| Cu | 3.38 |
| Pb | 92.1 |
| Sn | 426 |

Although described with specific reference to a process of recovering multiple metals from solution, step 240 can instead comprise the recovery of a single metal present in the solution produced by step 230. For example, step 240 can comprise extracting silver from the solution of step 230. In various embodiments, silver may be extracted from the solution via precipitation. In such embodiments, an acid or salt containing chlorine, such as hydrochloric acid (HCl) or sodium chloride (NaCl), can be added to the solution. The silver present in the solution will precipitate out of solution as solid silver chloride (AgCl), and can then be physically separated from the solution.

In other embodiments, silver can be extracted from the solution via electrowinning. With the application of an appropriate voltage for a sufficient time, the silver present in the solution will deposit on a cathode as solid metallic silver. In various embodiments, 95 percent or more of the silver present in the silicon solar cell can be recovered by utilizing the foregoing approaches.

The weights of silicon solar cells 102 can be measured before and after metal dissolution to determine the amount of metals in the HNO3 solution. The weight difference can be compared to the weight of metals recovered after sequential electrowinning to provide an evaluation of the effectiveness of the metal recovery process.

Method 200 can further comprise, for example, a chemical dissolution of non-recoverable species step 250. In various embodiments, the components of silicon solar cells 102 remaining after step 230 are removed from the nitric acid solution and rinsed to remove residues of nitric acid. These remaining components can then be immersed into a solution selected to dissolve remaining non-recoverable species present in the components of silicon solar cells 102. For example, the components can be immersed in an aqueous solution of hydrofluoric acid (HF). With an appropriate concentration and time, substantially all of the non-silicon species present in the components of silicon solar cells 102 are dissolved, leaving behind only silicon wafer 116. The materials dissolved can include, for example, silicon nitride and aluminum. With initial reference to FIG. 3B, silicon solar cell 102 after immersion in hydrofluoric acid for a sufficient time is illustrated.

In various embodiments, the use of hydrofluoric acid after step 230 selectively removes aluminum and silicon nitrides (without removing silicon such as, for example, within silicon wafer 116). The sequential use of HNO3 followed by HF prevents dissolution of non-recoverable metal species at the same time as dissolution of valuable, recoverable metal species.

Method 200 can further comprise a recovery of solar-grade silicon step 260. Step 260 can comprise, for example, immersing silicon solar cells 102 in sodium hydroxide (NaOH) solution. For example, immersion in the sodium hydroxide solution for sufficient time can dissolve substantially all of the remaining back-surface field 111 (which comprises aluminum) and emitter 113 (which comprises phosphorus) of silicon solar cells 102. After the desired components and chemical species have been removed, silicon solar cells 102 can be forwarded for further processing.

Figure 3B:
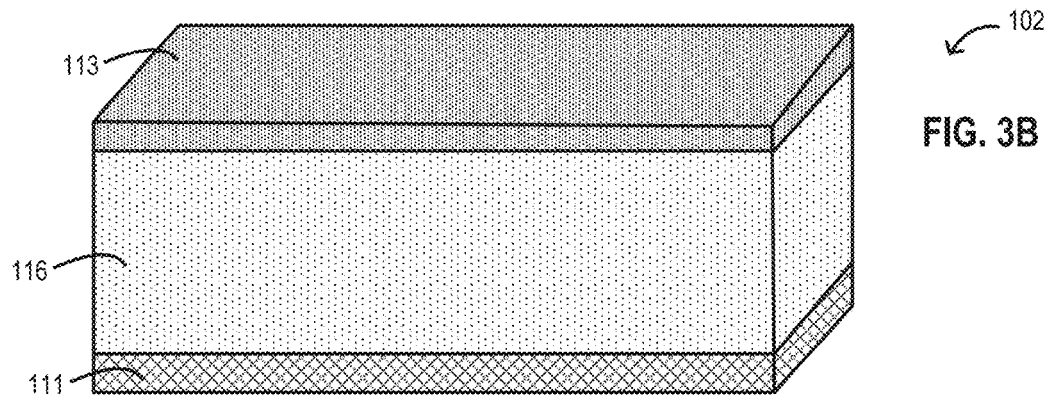
Figure 3C:
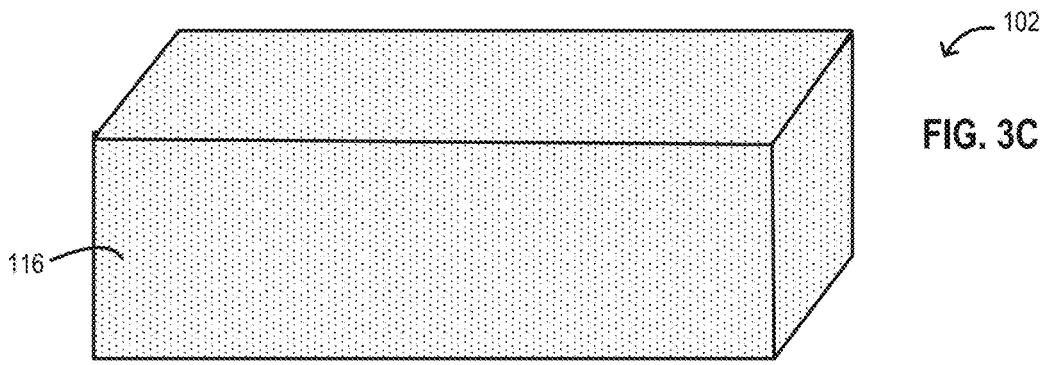

In an exemplary embodiment, after chemical dissolution of the metal electrodes and anti-reflection layer from silicon solar cell 102, the remaining cell as illustrated in FIG. 3B was immersed into a 3% aqueous solution of NaOH at 50° C. to remove emitter 113 and back-surface field 111. After sufficient time, as illustrated in FIG. 3C, only silicon wafer 116 remains of silicon solar cell 102.

In an experiment, a silicon solar cell 102 was immersed in NaOH solution and removed every 15 minutes. Upon removal, the sheet resistance of silicon solar cell 102 was measured from both the front and back sides by a four-point probe. With initial reference to FIGS. 4A and 4B, the reciprocal sheet resistance of the cell as a function of etch time and schematic representations of the silicon solar cell for various etch times are illustrated. Initially, the sheet resistances from the two sides are different because the sheet resistance from the front side is that of the n-type emitter, and the sheet resistance from the backside is that of the p+ back-surface field in parallel with the p-type base. After 15 min, the sheet resistances from the two sides are identical. This happens when the n-type emitter 113 is completely removed. As a result, no matter which side the sheet resistance is measured, it is always the sheet resistance of the p+ back-surface field 111 in parallel with the p-type base. After 30 min, the plot changes its slope. This is the time when the p+ back-surface field 111 is completely removed and only the lightly p-type base is left. From the slope in this region, the resistivity of the base is determined to be 1.4 Ω-cm, which agrees with the specifications of the starting silicon wafer 116.

Figures 4A, 4B:
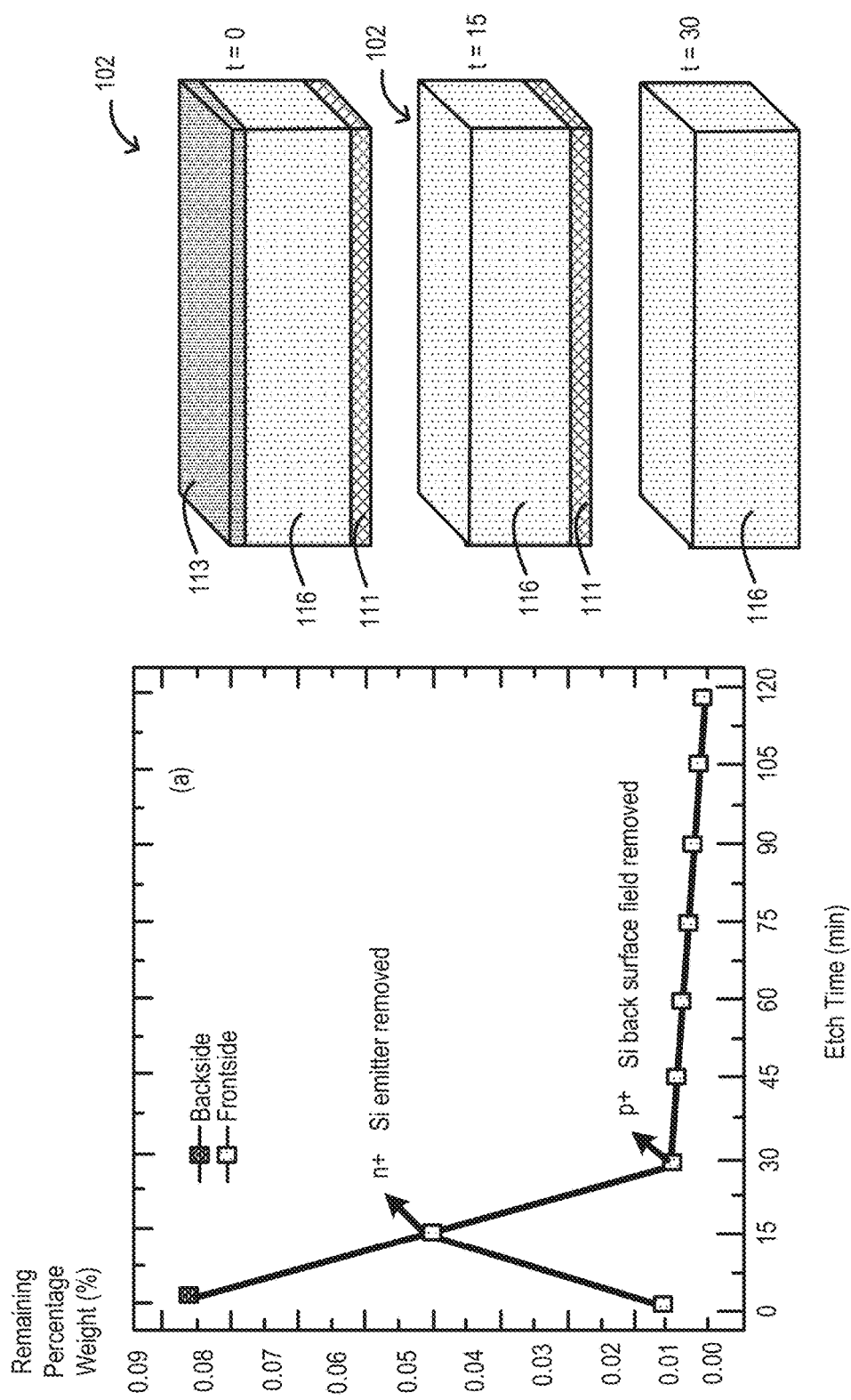
FIG. 4A illustrates a graphical reproduction of the reciprocal sheet resistance of a silicon solar cell in a 3% NaOH aqueous solution at 50° C. in accordance with an exemplary embodiment.
FIG. 4B illustrates the physical structure of the silicon solar cell at various points of etching corresponding to the graphical reproduction of FIG. 4A.
Figure 5:
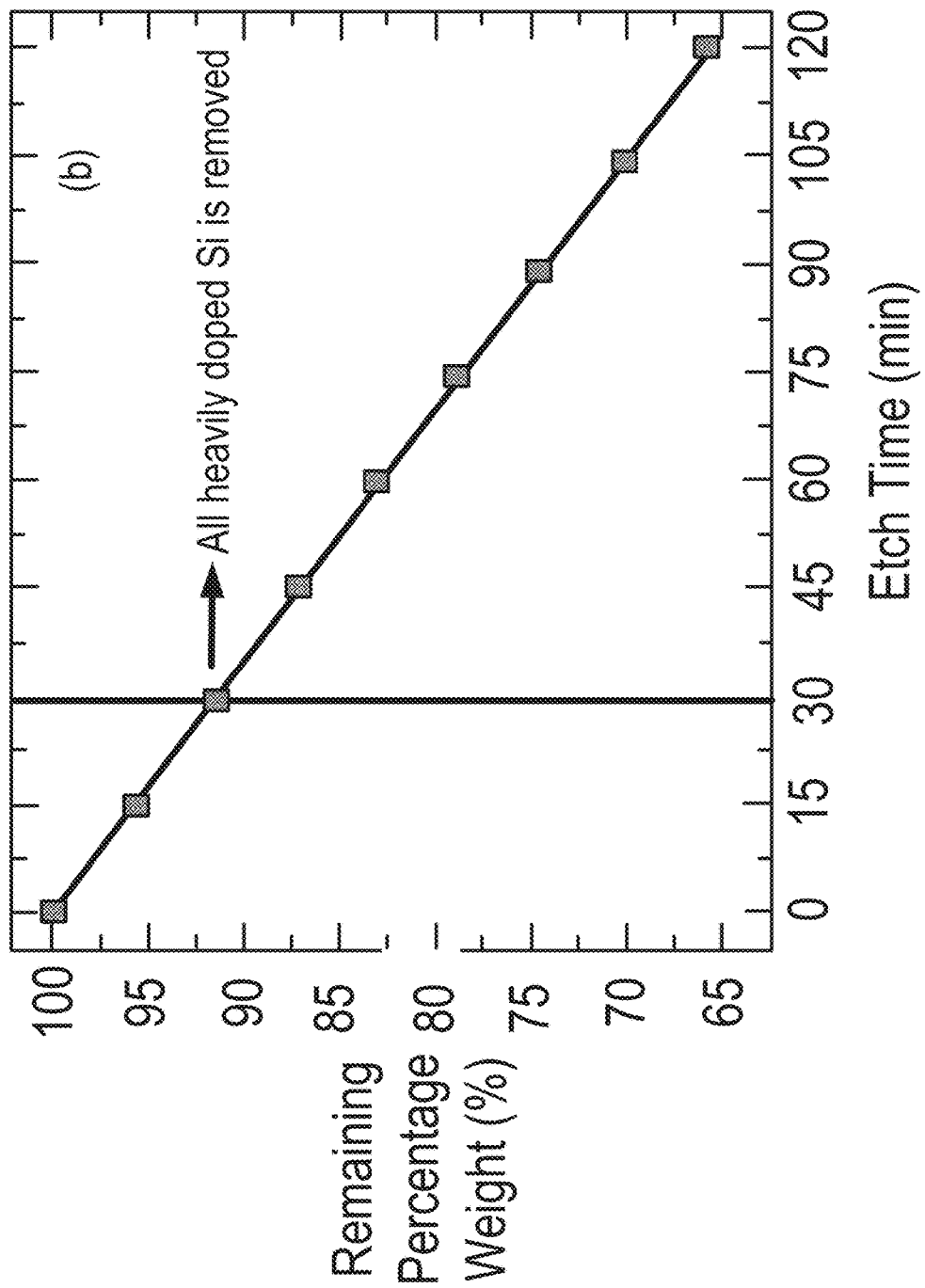
FIG. 5 illustrates the remaining weight of a silicon solar cell in NaOH as a function of etch time in accordance with an exemplary embodiment.

When the slope changes, it is time to stop the etch process and recover the maximum possible amount of solar-grade silicon from the cell. In an exemplary automated recycle machine, the sheet resistance can be used as a feedback control. For example, by measuring the remaining weight of the silicon solar cell as a function of etch time in 3% NaOH at 50° C., it was determined that a 30-min etch removes substantially all the heavily doped layers (i.e., back-surface field 111 and emitter 113), as illustrated in FIG. 5. FIG. 4A suggests that at 30 min, the remaining weight is ~91% of the original wafer, i.e. the amount of silicon recovered can be ~90%.

After sufficient removal of the back-surface field 111 and emitter 113, silicon solar cells 102 can be removed from the NaOH solution and rinsed with deionized water to remove residues of hydrofluoric acid. Rinsed silicon solar cells 102 are now ready for silicon recovery.

Method 200 can further comprise, for example, a treatment of waste chemicals step 270. For a process to be considered a green and/or sustainable recycling process, the waste chemicals have to be taken into consideration. For exemplary recycling processes discussed herein, waste chemicals, such as, for example, NaOH, HNO3, and HF, are produced. Principles of the present disclosure contemplate selection of one inorganic base and two inorganic acids for the recycling process, so the base and an acid can form a less harmful salt for disposal or further treatment. There is a well-established method to treat the HF waste, i.e., Ca(OH)2 is added to the HF waste to precipitate fluorine out as CaF2. The CaF2 can be used to regenerate HF, making it a closed sustainable loop. The remaining wastes, HNO3 and NaOH, can be mixed to form an aqueous solution of NaNO3, which is useable in agriculture as a fertilizer.

In an exemplary two-phase process to recycle silicon solar modules, the technology for the first phase, module recycling, largely utilized known techniques and materials. For example, the first phase may comprise step 220 of method 200. The second phase, cell recycling, is a novel phase for recycling silicon solar modules, as all the valuable and toxic materials are to be extracted in this phase and most of the waste chemicals are generated in this step. For example, the second phase may comprise a combination of steps 230-270 of method 200. In an exemplary embodiment, the second phase includes three major tasks: (i) Recovery of valuable and toxic metals (e.g., silver, copper, tin, lead); (ii) Recovery of solar-grade silicon; and (iii) Treatment of waste chemicals.

In contrast to prior approaches, exemplary material recovery approaches disclosed herein have significant advantages. A higher percentage of a silicon solar cell may be recycled, valuable metals may be obtained for resale, and toxic metals may be separated for separate disposal.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

What is claimed is:

1. A method for recycling materials from a silicon solar cell, the method comprising:
   vaporization of at least one polymeric layer of the silicon solar cell;
   chemical dissolution of a front electrode comprising silver, an interconnect of the silicon solar cell comprising tin, and copper in $HNO_3$ to form a metal-bearing solution;
   extraction of tin from the metal-bearing solution via sedimentation;
   sequentially electrowinning the first metal-bearing solution, comprising:
      placing the first metal-bearing solution in a three-electrode cell utilizing a first working electrode, a counter electrode, and a reference electrode, wherein the first working electrode comprises silver;
      applying a voltage between 0.3419 V and 0.7996 V versus standard hydrogen electrode to the first working electrode to deposit silver on the first working electrode;
      removing the first working electrode from the first metal-bearing solution and inserting a second working electrode into the first metal-bearing solution, wherein the second working electrode comprises copper; and
      applying a voltage between 0.1262 V and 0.3419 V versus standard hydrogen electrode to the second working electrode to deposit copper on the second working electrode;
   etching, using HF, at least one of a back electrode of the solar cell comprising aluminum or an anti-reflection layer of the solar cell comprising SiNx; and
   chemically removing an emitter layer of the solar cell using NaOH.

2. The method of claim 1, further comprising treating waste chemicals produced during the chemical dissolution.

3. The method of claim 1 wherein the sequential electrowinning further comprises:
   removing the second working electrode from the metal-bearing solution and inserting a third working electrode into the metal-bearing solution, wherein the third working electrode comprises copper; and
   applying a more negative voltage than −0.1262 V versus standard hydrogen electrode to the third working electrode to deposit lead on the third working electrode.

4. A method for recycling materials from a silicon solar cell, the method comprising:
   providing a silicon solar cell comprising a silicon wafer positioned between an emitter and a back-surface field, a back electrode positioned on a back side of the silicon wafer, a front electrode comprising silver and positioned on the front side of the silicon wafer, and an anti-reflection layer positioned on the front side of the silicon wafer;

chemical dissolution of the front electrode and an interconnect of the silicon solar cell comprising lead, tin, and copper to form a metal-bearing solution;

extraction of tin from the metal-bearing solution via sedimentation;

extraction of at least one of silver, lead, and copper from the metal-bearing solution via sequential electrowinning, comprising:

placing the metal-bearing solution in a three-electrode cell utilizing a first working electrode, a counter electrode, and a reference electrode, wherein the first working electrode comprises silver;

applying a voltage between 0.3419 V and 0.7996 V versus standard hydrogen electrode to the first working electrode to deposit silver on the first working electrode;

removing the first working electrode from the metal-bearing solution and inserting a second working electrode into the metal-bearing solution, wherein the second working electrode comprises copper;

applying a voltage between −0.1262 V and 0.3419 V versus standard hydrogen electrode to the second working electrode to deposit copper on the second working electrode;

removing the second working electrode from the metal-bearing solution and inserting a third working electrode into the metal-bearing solution, wherein the third working electrode comprises copper; and applying a more negative voltage than −0.1262 V vs standard hydrogen electrode to the third working electrode to deposit lead on the third working electrode;

etching, using hydrofluoric acid, a back electrode of the solar cell comprising aluminum and an anti-reflection layer of the solar cell comprising SiNx;

chemically removing, using NaOH, a layer of the emitter of the silicon solar cell and a back-surface field of the silicon solar cell; and treating waste chemicals produced during the chemical dissolution.

5. The method of claim 4, wherein the layer of the emitter comprises a heavily phosphorus doped layer, and the back-surface field comprises a heavily aluminum doped layer.

6. The method of claim 4, wherein the anti-reflection layer comprises a silicon nitride layer.

* * * * *